(12) United States Patent
Hussain et al.

(10) Patent No.: US 8,355,409 B2
(45) Date of Patent: *Jan. 15, 2013

(54) POWERED DEVICE ANALYSIS AND POWER CONTROL IN A POWER-OVER-ETHERNET SYSTEM

(75) Inventors: Asif Hussain, Tustin, CA (US);
Manisha Pandya, Anaheim Hills, CA (US); Farzan Roohparvar, Monte Sereno, CA (US); John Perzow, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,600

(22) Filed: Dec. 30, 2011

(65) Prior Publication Data

US 2012/0102341 A1  Apr. 26, 2012

Related U.S. Application Data

(63) Continuation of application No. 11/727,596, filed on Mar. 27, 2007, now Pat. No. 8,149,858.

(60) Provisional application No. 60/878,676, filed on Jan. 5, 2007.

(51) Int. Cl.
*H04L 12/28* (2006.01)
*H02J 7/34* (2006.01)
(52) U.S. Cl. .......................................... 370/419; 307/52
(58) Field of Classification Search ........................ None
See application file for complete search history.

(56) References Cited

U.S. PATENT DOCUMENTS

| | | | |
|---|---|---|---|
| 2003/0099076 A1 | 5/2003 | Elkayam et al. |
| 2005/0057869 A1 | 3/2005 | Hale et al. |
| 2006/0092000 A1 | 5/2006 | Karam et al. |
| 2006/0218422 A1 | 9/2006 | Camagna et al. |
| 2008/0054720 A1 | 3/2008 | Lum et al. |
| 2008/0151444 A1 | 6/2008 | Upton |
| 2008/0175260 A1 | 7/2008 | Hussain et al. |

OTHER PUBLICATIONS 802.3af™, *IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)*, IEEE Computer Society, IEEE, New York, NY, ISBN 0-7381-3696-4 (SH95132) (Print), ISBN 0-7381-3697-2 (SS95132) (PDF), Jun. 18, 2003, pp. i-x and 1-121 (133 pages total).

*Primary Examiner* — John Blanton
(74) *Attorney, Agent, or Firm* — Sterne, Kessler, Goldstein & Fox p.l.l.c.

(57) ABSTRACT

A system and method of analyzing a powered device (PD) in a Power-over-Ethernet (PoE) system are presented. The system includes an Ethernet interface having a physical layer (PRY) chip capable of providing a signal pulse in addition to physical layer 1 functions. The system further includes a pulse transformer, coupled to the PRY chip, capable of relaying the signal pulse provided by the PRY chip to the PD via the transmit line and a second PRY chip. The first PRY chip receives one or more return pulse signals from the PD, analyzes characteristics such as voltage and/or frequency of the return pulse signal(s), and determines attributes of the PD based on those characteristics. The attributes can include powered device validity and power classification. A method of supplying power to a PD is also presented.

20 Claims, 10 Drawing Sheets

PD POWER CLASSIFICATIONS
(IEEE 802.3af™ – 6/18/03)

| Class | Usage | Range of Maximum Power Used by the PD |
|---|---|---|
| 0 | Default | 0.44 to 12.95 Watts |
| 1 | Optional | 0.44 to 3.84 Watts |
| 2 | Optional | 3.84 to 6.49 Watts |
| 3 | Optional | 6.49 to 12.95 Watts |
| 4 | Not Allowed | Reserved for Future Use |

FIG. 5

PD CLASSIFICATION
(IEEE 802.3af™ – 6/18/03)

| Measured IClass | Classification |
|---|---|
| 0mA to 5mA | Class 0 |
| >5mA and <8mA | May be Class 0 or 1 |
| 8mA to 13mA | Class 1 |
| >13mA and <16mA | May be Class 0, 1, or 2 |
| 16mA to 21mA | Class 2 |
| >21mA and <25mA | May be Class 0, 2, or 3 |
| 25mA to 31mA | Class 3 |
| >31mA and <35mA | May be Class 0, 3, or 4 |
| 35mA to 45mA | Class 4 |
| >45mA and <51mA | May be Class 0 or 4 |

FIG. 6

CLASSIFICATION SIGNATURE, MEASURED AT PD INPUT
(IEEE 802.3af™ – 6/18/03)

| Parameter | Conditions (V) | Minimum (mA) | Maximum (mA) |
|---|---|---|---|
| Current for Class 0 | 14.5 to 20.5 | 0 | 4 |
| Current for Class 1 | 14.5 to 20.5 | 9 | 12 |
| Current for Class 2 | 14.5 to 20.5 | 17 | 20 |
| Current for Class 3 | 14.5 to 20.5 | 26 | 30 |
| Current for Class 4 | 14.5 to 20.5 | 36 | 44 |

FIG. 7

POWERED DEVICE ANALYSIS AND POWER CONTROL IN A POWER-OVER-ETHERNET SYSTEM

CROSS REFERENCE TO RELATED APPLICATIONS

This application is a continuation of U.S. application Ser. No. 11/727,596, file on Mar. 27, 2007, now U.S. Pat. No. 8,149,858, which claims the benefit of U.S. provisional application no. 60/878,676, filed on Jan. 5, 2007, both of which are incorporated by reference herein in their entireties.

BACKGROUND OF THE INVENTION

1. Field of the Invention

The present invention generally relates to Power-over-Ethernet (PoE) systems. More specifically, the present invention relates to analysis of PoE devices (or Powered Devices (PD)) in a PoE system.

2. Related Art

In conventional PoE systems, a power sourcing equipment (PSE) chip analyzes characteristics of a PD and can control the supply of power to the PD. This analysis and control by a PSE chip occurs through an Ethernet interface including a PSE physical layer (PHY) chip and a PD PHY chip with a data link in between. In this system, the PSE PHY chip typically handles physical layer 1 functions and drives the link, activity, speed, and PoE light-emitting diodes (LEDs). This system is inefficient in that, with the PSE chip separate from the PHY, a host CPU needs to collect information from the PSE chip and send it to the PSE PHY chip in order for PoE status to be displayed. In some systems, the PSE chip drives the LED independently of the PHY chip, which is expensive. In addition, smaller and less expensive PoE systems that are more efficient than conventional PoE systems are currently desired in the industry. Therefore, what is needed is a smaller, more efficient PD analysis and power control system that saves host CPU processing time and power, and eliminates the need for additional communication interfaces. As exemplified by conventional cable diagnostics, certain system attributes can be determined in a PoE system through signal analysis, and this signal analysis can be done in a PHY chip. It would be useful to build upon the concept of conventional cable diagnostics to realize a PoE system that addresses the deficiencies of conventional systems and meets the aforementioned goals.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 5 is a table showing the current IEEE 802.3af™ standard of PD power classifications for ranges of maximum power used by the PD.

FIG. 6 is a table showing the current IEEE 802.3af™ standard of PD power classification based on the current.

FIG. 7 is a table showing the current IEEE 802.3af™ standard of classification signatures for current measured at the PD input.

DETAILED DESCRIPTION OF THE INVENTION

Figure 1:
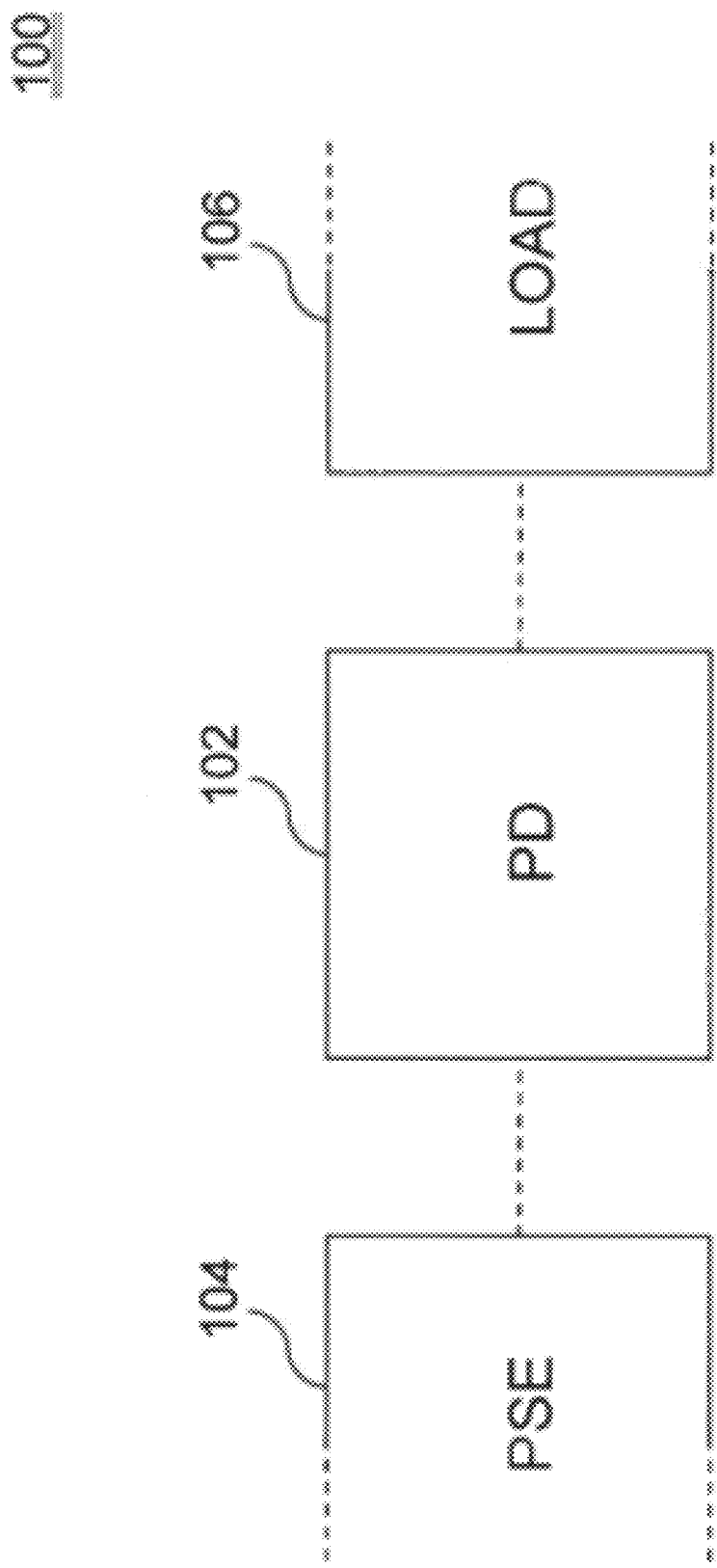
FIG. 1 is a block diagram of a conventional PD chip architecture.

The following describes powered device (PD) analysis in a Power-over-Ethernet (PoE) system. FIG. 1 illustrates a conventional powered device chip architecture 100, with a powered device chip (PD) 102 connected to a power sourcing equipment chip (PSE) 104 and a load 106. The PSE 104 analyzes characteristics of PD 102, and can, for example, monitor and control the application of power to PD 102 based on those characteristics. In a more specific example, PSE 104 can detect and validate a compatible PD, determine a power classification signature for the validated PD, supply power to the PD, monitor the power, and reduce or remove the power from the PD when the power is no longer requested or required. During detection, if PSE 104 finds a PD to be non-compatible, PSE 104 can prevent the application of power to that PD, protecting the PD from possible damage.

Figure 2:
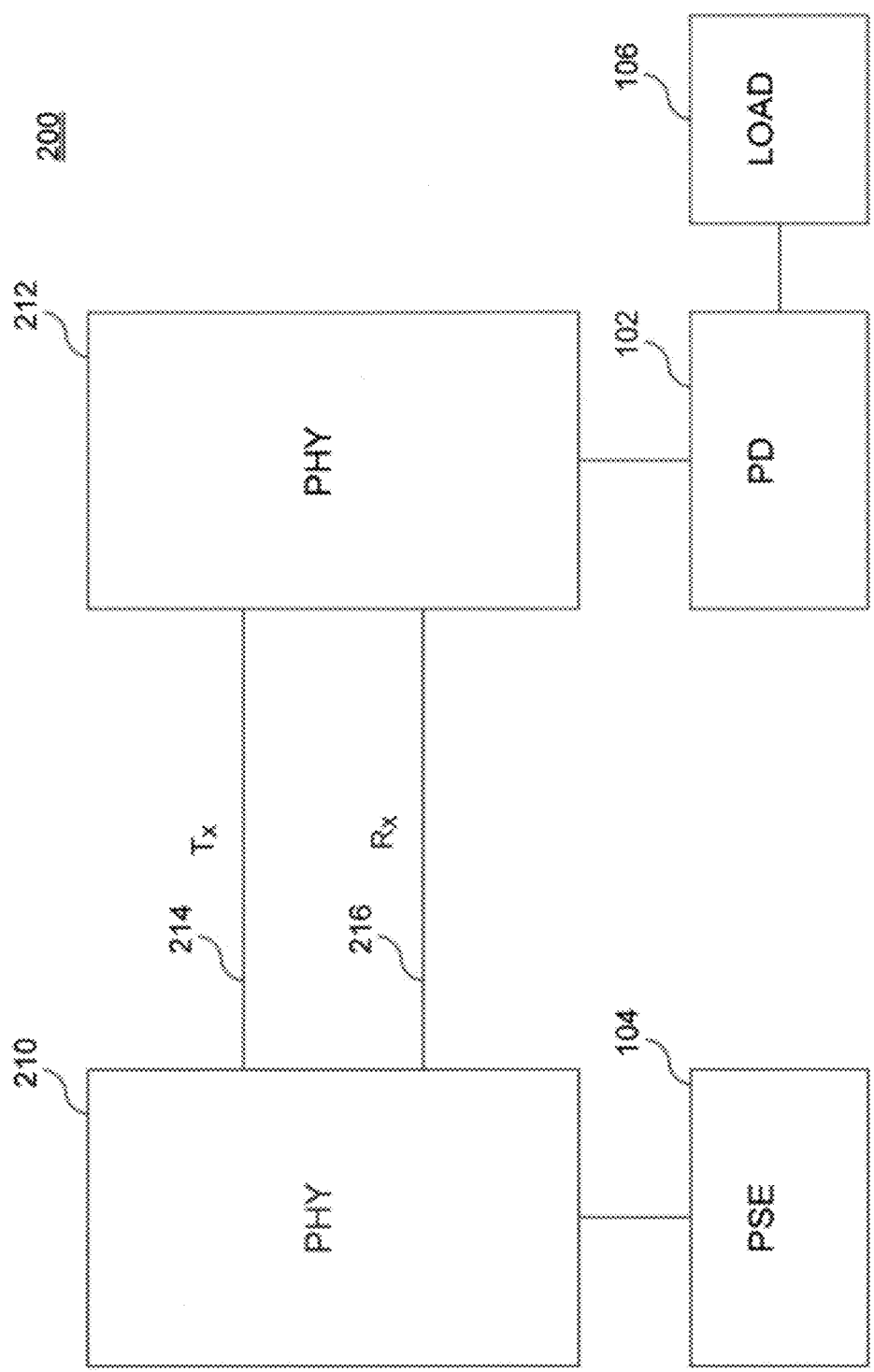
FIG. 2 is a block diagram of a simplified conventional PoE system.

In a conventional PoE system, PSE 104 is connected to PD 102 through an Ethernet interface, as shown in PD chip architecture 200 depicted in FIG. 2. As shown in FIG. 2, PSE 104 is coupled to PSE PHY 210 and PD 102 is coupled to PD PHY 212. PSE PHY 210 and PD PHY 212 are connected through a data link, such as through transmit line 214 and receive line 216. The data link may be in the form of a CATV cable using a typical 100 Base-T Fast Ethernet standard or 1000 Base-T interface. As the name would imply, a Power-over-Ethernet system enables a power transfer from a power source to a powered device over Ethernet. Typically, this is accomplished at the direction of PSE 104, as described in more detail with reference to FIG. 3.

Figure 3:
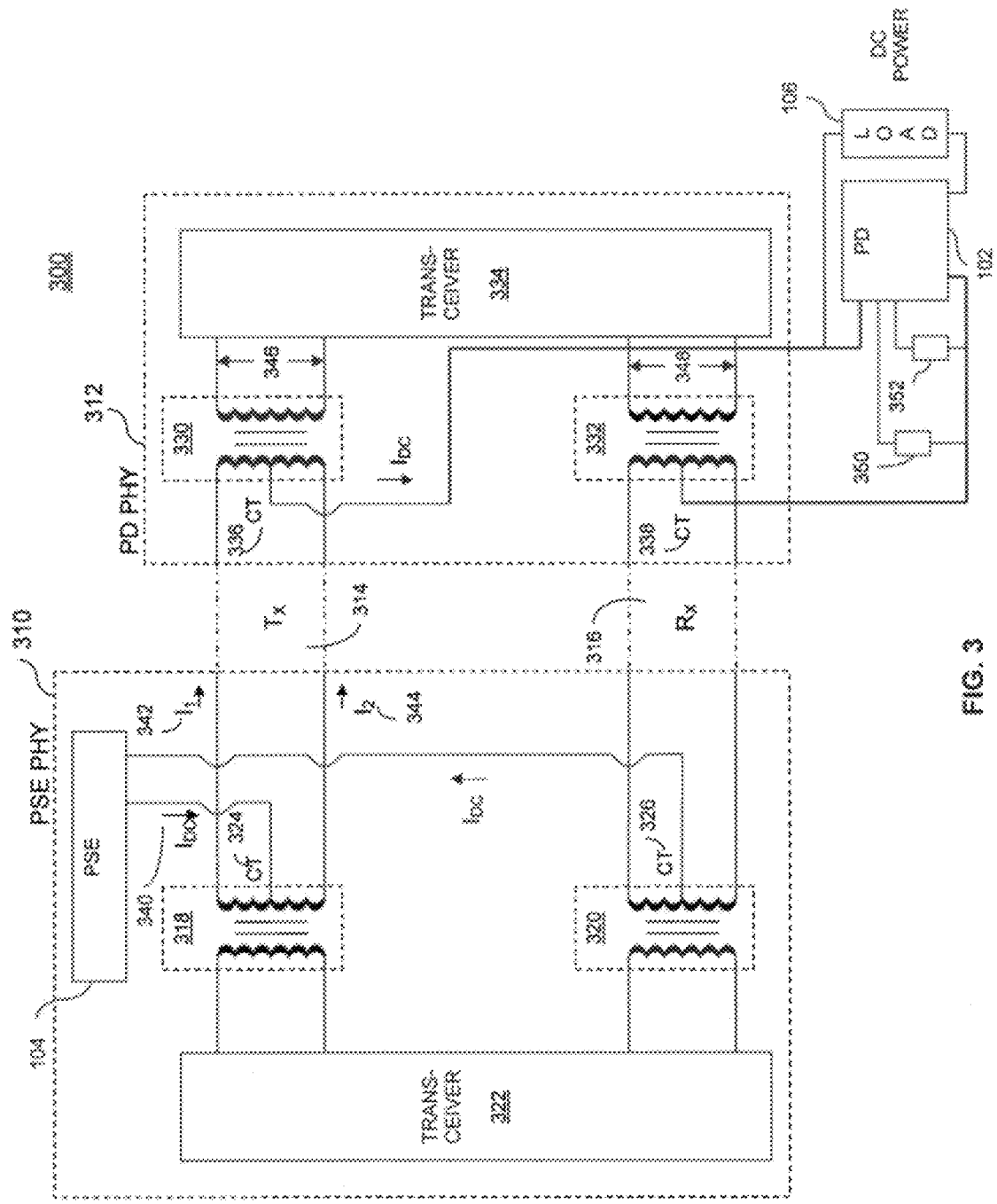
FIG. 3 illustrates conventional power transfer from a PSE chip to a PD chip.

Power transfer includes the transferring of high speed data over Ethernet from one differential pair (at the PSE side, for example) to another differential pair (at the PD side, for example). FIG. 3 shows a typical, more detailed, circuit for power transfer over a communication system to PD 102 that is remotely located relative to PSE 104. PSE 104 provides direct current (DC) to PD 102 over communication mediums 314 and 316 via PSE PHY 310 and PD PHY 312. Each communication medium 314/316 can include a pair of communication conductors (e.g., twisted pair conductors found in Ethernet cable). PSE PHY 310 has a first transformer 318 and a second transformer 320 that provide for transport of communication signals to communication medium 314 and communication medium 316 from a PSE transceiver 322. The first transformer 318 has a first center tap 324. The second transformer 320 has a second center tap 326. The first center tap 324 and the second center tap 326 are connected to a PSE circuit 104 within PSE PHY 310. The first center tap 324 and second center tap 326 are connected respectively on sides of the first transformer 318 and second transformer 320, which are connected respectively to communication medium 314 and communication medium 316.

PD PHY 312 has a third transformer 330 and a fourth transformer 332 that connect a powered device transceiver 334 to communication medium 314 and communication medium 316. The third transformer 330 has a third center tap 336. The fourth transformer 332 has a fourth center tap 338. PD 102 receives DC power from the third center tap 336 and the fourth center tap 338 over communication medium 314 and communication medium 316, respectively.

During ideal operation, a direct current ($I_{DC}$) 340 flows from the PSE interface 104 through the first center tap 324, and divides into a first current ($I_1$) 342 and a second current ($I_2$) 344 carried over communication medium 314. The first current ($I_1$) 342 and the second current ($I_2$) 344 then recombine at the third center tap 336 to reform the direct current ($I_{DC}$) 340 to power PD 102. On return, the direct current ($I_{DS}$) 340 flows from PD 102 through the fourth center tap 338, divides for transport over communication medium 316, recombines at the second center tap 326, and returns to the PSE interface 104. While power is being supplied, a first communication signal 346 and/or a second communication signal 348 are simultaneously carried via communication medium 314 and communication medium 316. FIG. 2 also shows load 106 as well as a signature resistor 350 and a classification resistor 352 connected to PD 102. Signature resistor 350 is used to validate PD 102, and classification resistor 352 is used for classifying PD 102, as will be discussed below.

In order to conduct its management and control of PD 102, PSE 104 analyzes certain characteristics of PD 102, and the system as a whole, based on measurements taken at PD 102. Based on those characteristics, PSE 104 can determine certain attributes of PD 102 as well as attributes of the system. Example attributes determined by PSE 104 can include, but are not limited to, the following: valid device detection, power classification, AC disconnect information, short circuit detection, PD load variations, various current measurements, overload conditions, and inrush conditions. The attributes of device detection and power classification will be used to exemplify the invention, as discussed below. However, before discussing the invention, device detection and power classification in a conventional PoE system will be described for sake of comparison.

IEEE has imposed standards on the detection, power classification, and monitoring of a PD by a PSE in the current IEEE 802.3af™ standard, as will be discussed in more detail throughout this specification as an example only. The invention as described herein is not to be limited to the boundaries of this standard, as standards tend to change with the passage of time and the introduction of new technologies. Any future standard, such as IEEE 802.3at, can also be supported by the present invention.

Figure 4:
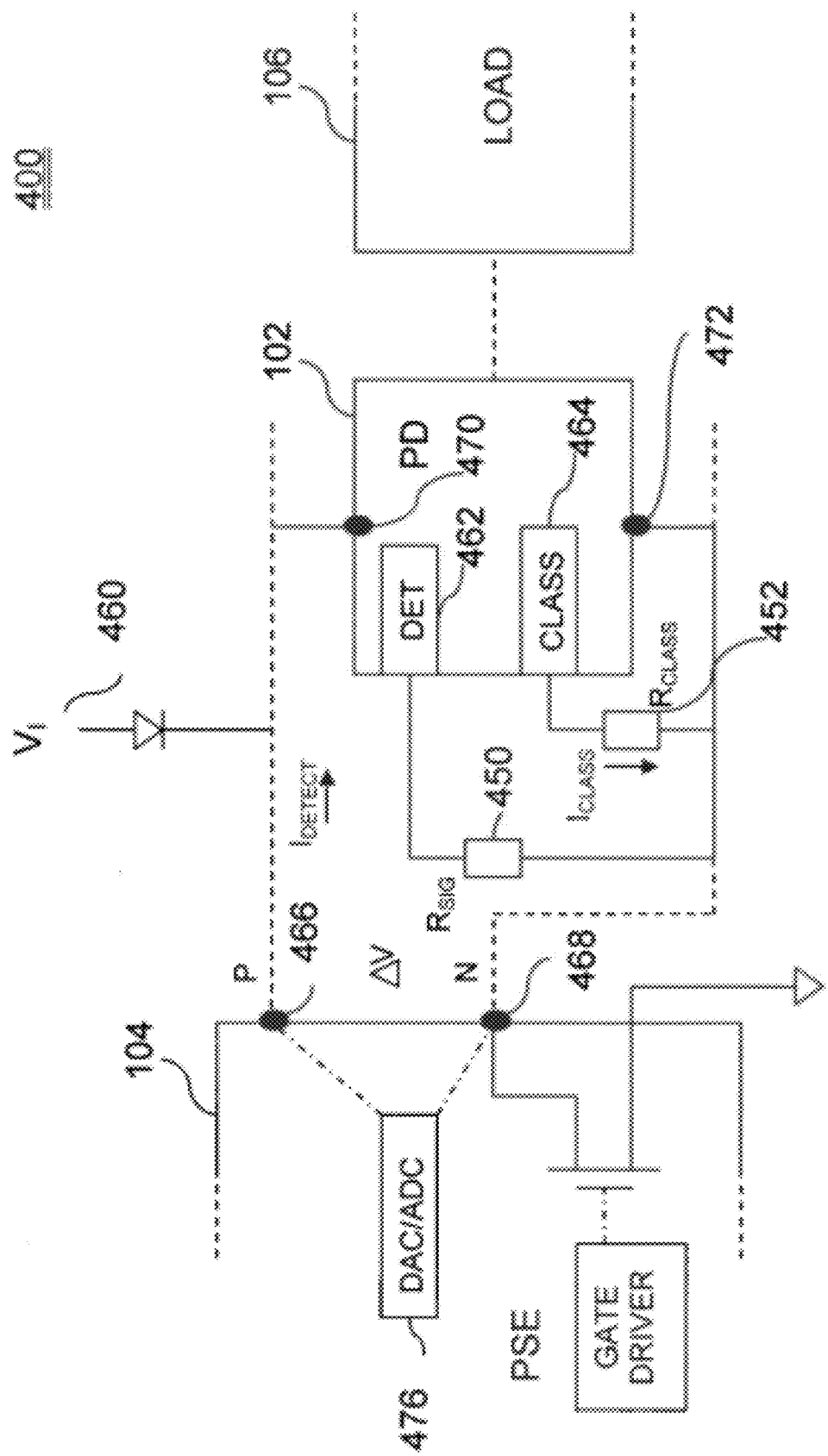
FIG. 4 illustrates a PD chip architecture with conventional device detection and power classification.

Power classification will be introduced with reference to FIG. 4, which illustrates conventional PD chip architecture 400. As shown in FIG. 4, positive terminal 466 of PSE 104 is connected to a first terminal 470 of PD 102, and negative terminal 468 of PSE 104 is connected to a second terminal 472 of PD 102. (For the sake of simplicity, bridge rectifiers and series diodes are not considered.) A voltage source 460 is connected to the positive terminal 466 of PSE 104 to provide input voltage $V_I$. According to the current IEEE 802.3af™ standard, the operating voltage should range from 44V to 57V.

As shown in FIG. 4, PD 102 includes detection circuitry 462 and classification circuitry 464. A signature resistance 450 is located between detection circuitry 462 and the negative terminal 468 of PSE 104. Signature resistance 450 is used to determine the validity of PD 102, as will be described in more detail below. A classification resistor 452 is located between classification circuitry 464 and the negative terminal 468 of PSE 104. Current ($I_{CLASS}$) across the classification resistor 452 determines the power classification signature for PD 102, as will also be discussed in more detail below.

Before power is supplied to PD 102, PSE 104 first determines whether PD 102 is a valid device. This is called 'detection.' For detection, PSE 104 measures the current ($I_{DETECT}$). This can be done using an internal digital-to-analog converter 476 connected to positive terminal 466, for example. In addition, PSE 104 probes for the voltage drop ($\Delta V$) between positive terminal 466 and negative terminal 468. This can be done using an internal analog-to-digital converter 476, for example. Alternatively, a bandgap voltage (e.g., in the range 2.7V to 10.1V) (not shown) can be applied at PD 102. The resistive signature $R_{SIG}$ 450 is then calculated according to $R_{SIG}=\Delta V/I_{DETECT}$. If $R_{SIG}$ is calculated to be an expected value (e.g., approximately 25K ohms, or within a specified resistance value range), then PD 102 is determined to have a valid signature and is deemed a compatible valid device. If PD 102 is deemed a non-compatible device, then power will not be supplied to PD 102.

After detection of a valid PD, power classification occurs. Power classification is used to determine the range of minimum power needed at the output of PSE 104 and, in turn, the range of maximum power to be used by PD 102, according to IEEE 802.3af™. For power classification, PSE 104 applies a voltage at PD 102. For voltage applied to PD 102 ranging from 14.5V to 20.5V, IEEE 802.3af™ currently defines four classifications (classes 0-3) of power ranges, with a fifth classification (class 4) reserved for future use (but currently treated as class 0). These power classifications are shown in the table of FIG. 5. As shown in FIG. 5, the maximum power used by the PD is defined to be as high as 12.95 watts. In order to classify the PD to the appropriate power range, the current is measured through classification resistor 452. IEEE 802.3af™ has defined PD classifications 0-4 for current ranging from 0 mA to 51 mA, as shown in the table of FIG. 6. IEEE 802.3af™ has also defined classification signatures for classes 0-4, measured at the PD input, as shown in the table of FIG. 7. As shown in FIGS. 6 and 7, the current IEEE standard supports PD power classification for up to 51 mA of current measured through classification resistor 452.

In the conventional examples described above using a PSE chip, resistive signature $R_{SIG}$ 450 is measured to determine PD validity, and current through classification resistor 452 is measured to determine the power classification. PD validity and power classification are two important attributes of a PD with regard to PoE solutions. It was determined that, by adapting concepts used for known cable diagnostics, which are sometimes executed at a PHY chip, it was possible to develop a PD analysis system in which it is not necessary to include a PSE chip.

Referring back to FIG. 3, cable diagnostics will be explained. Cable diagnostics typically use time domain reflectometry (TDR) to analyze a conductor, such as a wire, cable, or fiber optic. To execute cable diagnostics, a signal pulse (such as a TDR pulse) (not shown) is transmitted from PSE PHY 310 via transceiver 322 across transformer 318 and across transmit line ($T_X$) 314 to PD PHY 312. A subsequent return and/or reflected (or echoed) signal (not shown) can signify what is occurring on the cable. For example, if a signal pulse is transmitted and there is no reflection or return on the $R_X$ line 316, then this signifies that the cable is not terminated. Many cable characteristics can be detected using this method (e.g., whether the cable is connected, whether the other side is dead, what impedance may exist, etc.). However, this concept cannot be directly applied to a PD. As shown in FIG. 3, the PD chip is located at the center tab. A transmitted differential signal will cancel out. Therefore, PD analysis cannot be done using the same technique as is used for cable diagnostics.

Figure 8:
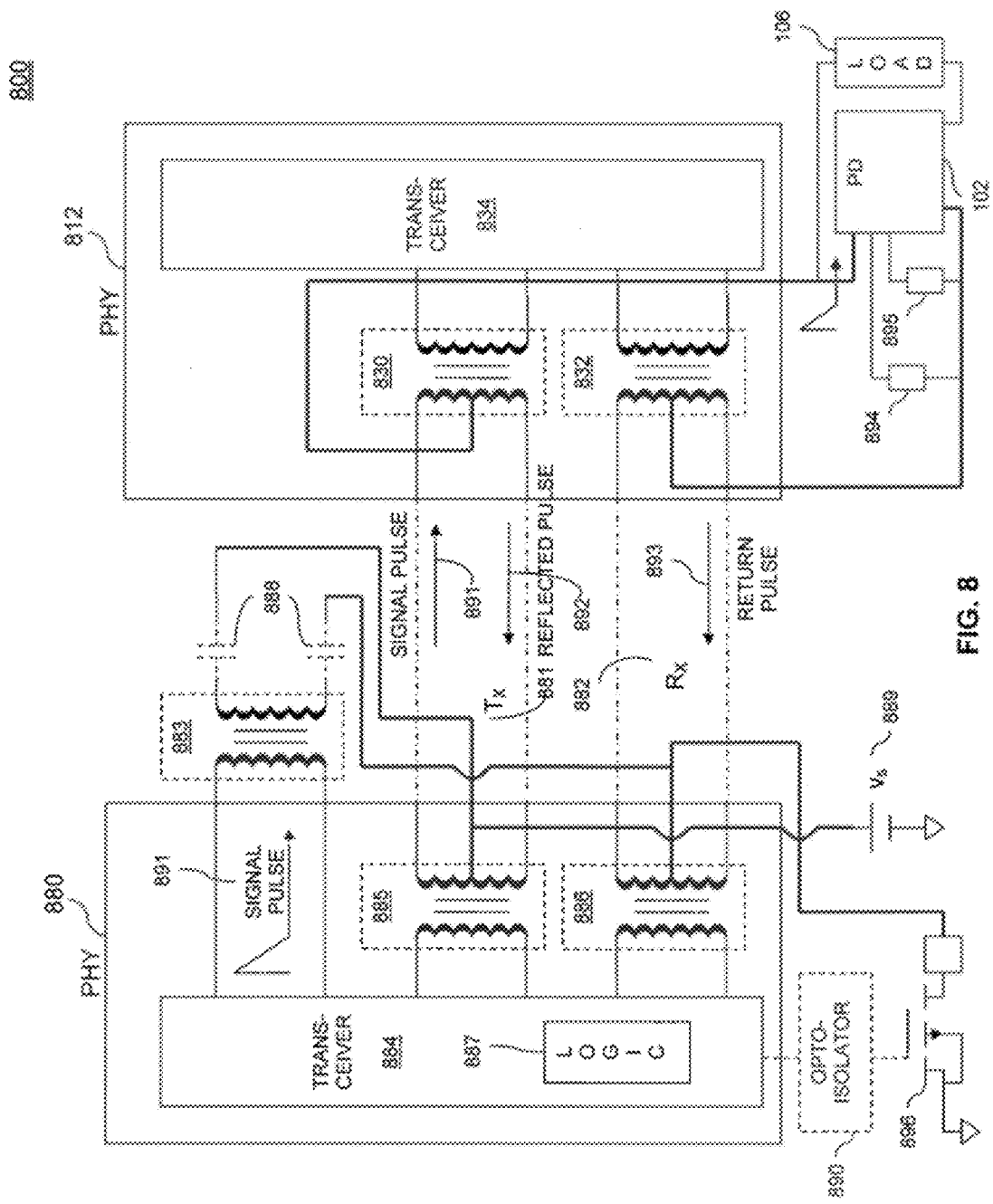
FIG. 8 illustrates a PD analysis and power control system, according to embodiments of the present invention.

FIG. 8 illustrates a PD analysis system 800, according to the present invention, that overcomes the deficiencies of using the cable diagnostic technique described above. System 800 includes a PHY chip 880, that includes a transceiver 884 coupled to a transmit transformer 885 and a receive transformer 886. Transceiver 884 includes logic 887, used for device analysis (such as PD analysis and cable diagnostics). Logic 887 can include, for example, an analog-to-digital converter. An analog-to-digital converter and appropriate state machine already existed in PHY chip 880 to handle cable diagnostics. For the PD analysis to be conducted by the present invention, a state machine and/or algorithm within logic 887 need(s) to be added, changed, and/or adjusted.

System 800 also includes PD PHY chip 812, which includes transceiver 834 coupled to transmit transformer 830 and receive transformer 832. PD 102 is coupled to both transmit transformer 830 as an input to PD 102 and receive transformer 832 as a return from PD 102. PD 102 is also coupled to load 106, as well as to a signature resistor 894 for validation and to a classification resistor 895 for power classification of PD 102. PHY chip 880 and PD PHY chip 812 are connected by transmit line ($T_X$) 881 running between transmit transformer 885 and transmit transformer 830, as well as by receive line ($R_X$) 882 running between receive transformer 886 and receive transformer 832.

Transceiver 884 is coupled to a third transformer, pulse transformer 883, through which a signal pulse 891 is provided to PD 102 by transceiver 884 via transmit line ($T_X$) 881 and transmit transformer 830, allowing the signal pulse to be a common mode pulse, instead of a differential pulse. Direct current (DC) blocking capacitors 888 can be included, as shown in FIG. 8, to prevent a DC short circuit. In operation, transceiver 884 transmits signal pulse 891 through transformer 883 to transmit line ($T_X$) 881. Signal pulse 891 then travels through transformer 830 to PD 102. Because signal pulse 891 is not differential, reflected signal 892 and return signal 893 do not cancel out, and everything is received back. Reflected signal 892 and return signal 893 are received at transceiver 884. At transceiver 884, logic 887 analyzes characteristics of reflected signal 892 and/or return signal 893 to determine attributes of the PD 102 side of the circuit. Example signal characteristics that are analyzed by logic 887 can include, but are not limited to, frequency and/or voltage characteristics, such as polarity, intensity, amplitude, and/or other electrical signatures. By examining these electrical signatures, a remote device, such as a PD, can be precisely located and analyzed. Example attributes can include, but are not limited to, device validity, power classification, AC disconnect information, short circuit detection, current measurement, overload conditions, and/or inrush conditions, for example. It will be appreciated by those skilled in the relevant art(s) that, although only one additional transformer 883 is discussed, it is possible to use more than one of such transformer circuits to be able to receive the return pulse.

Important PD attributes that need to be determined in a PoE system are device validity and power classification, as discussed above. A description of how the present invention is used to control power supplied to a PD in a NE system will now be presented.

Return pulse 892 and/or reflected pulse 893 can be analyzed by logic, 887 to determine device validity. Similar to that discussed above with reference to FIG. 4, a resistive signature 894 is either determined directly, or calculated, by logic 887 from information provided in return pulse 892 and/or reflected pulse 893. If resistive signature 894 is determined or calculated to be an expected value, then, PD 102 is determined to have a valid signature and is deemed a compatible valid device. If PD 102 is deemed a non-compatible device, then power will not be supplied to PD 102. Once a valid PD 102 is detected, its power classification is determined. To obtain the power classification, current through classification resistor 895 is either determined directly, or calculated, by logic 887 from information provided in return pulse 892 and/or reflected pulse 893. That determined or calculated current can then be used by logic 887 to determine the power classification for PD 102 (e.g., based on an IEEE standard similar to that discussed in reference to FIG. 4). Once a valid device PD 102 is detected and its power classification is determined, power can be supplied to PD 102.

In order to supply power to PD 102, a voltage source ($V_S$) 889 is provided. Voltage source ($V_S$) 889 is connected to transmit line ($T_X$) 881. Power is transmitted along transmit line ($T_X$) 881, through transformer 830 to PD 102. Transceiver 884 can control the power supplied to PD 102 via an opto-isolator 890 at the gate of a field-effect transistor (FET) 896. The opto-isolator 890 is necessary because there is an isolation requirement. Further, transceiver 884 can have a simple output port to control the external FET 896, or it can optionally have a serial communication interface to control multiple external FETs. Power is connected through FET 896. Transceiver 884 drives FET 896 to turn it on or off. When it is turned on, FET 896 is connected to the receive line ($R_X$) 882 at transformer 886. There is a loop-back, and power is connected.

Prior to the IEEE 802.3af™ standard, those companies involved in the industry had their own method of detection and connecting power. This is called legacy detection. The solution described in this specification can be applied to those legacy PDs, making it a complete solution for the industry. This becomes important when the electronic signatures necessary for analysis of the legacy chips come from other devices, such as capacitors, rather than resistances, for example.

The example shown in FIG. 8 is that of a single-port PHY chip. However, the present invention is not to be limited to a single port. Multiple port PHY chips (that include multiple FETs, for example) also exist and the present invention applies to all ports of a multiple-port PHY chip as well. Additionally, in the example shown, only two pairs are depicted. The present invention is not to be limited to only two pairs. In a 1000 Base-T Ethernet port, for example, all four pairs can be used.

One embodiment of the present invention can include a switching chip connected to PHY chip 880 through an interface, such as an MDIO interface, for example. In this embodiment, the switching chip could contain the power management algorithms, for example, which could then be used to manage multiple PHY chips. In these embodiments, the PHY chip(s) can conduct the analyses (e.g., analyzing electronic signatures). However, the switching chip(s) can handle the power management (e.g., how much power to connect to each port, maximum thresholds, and/or signature types).

In one embodiment, there can be four LED outputs per port. One of the LED outputs can be used as an output to control FET 896. In an alternative embodiment, a serial communication interface can be used to drive one or more FETs.

One advantage of this invention is that PoE status indication is implemented more easily. In previous PoE systems, the status information had to be polled from the PSE controller chip and then written to the PHY chip for LED indication. The PSE chip and the PHY chip did not have a direct connection; therefore, the PHY chip did not know when power was connected. Since the power LED was typically driven by the PHY chip, an external microcontroller or processor had to gather the status information from the PSE controller chip and send that information to the PHY chip. Here, because the PHY chip, and not a PSE controller chip, is managing the power supply to the PD(s), it is always aware when power is connected.

The above-described PD analysis system eliminates the need for a PSE controller chip to execute PD analysis and power supply in a PoE system. Therefore, the rest of a PSE can be implemented externally and will not require any intelligence. The PHY chip (such as PHY chip 880) can either have a serial interface to an external PSE switch or may have one pin per port, using opto-isolators, for example.

Figure 9:
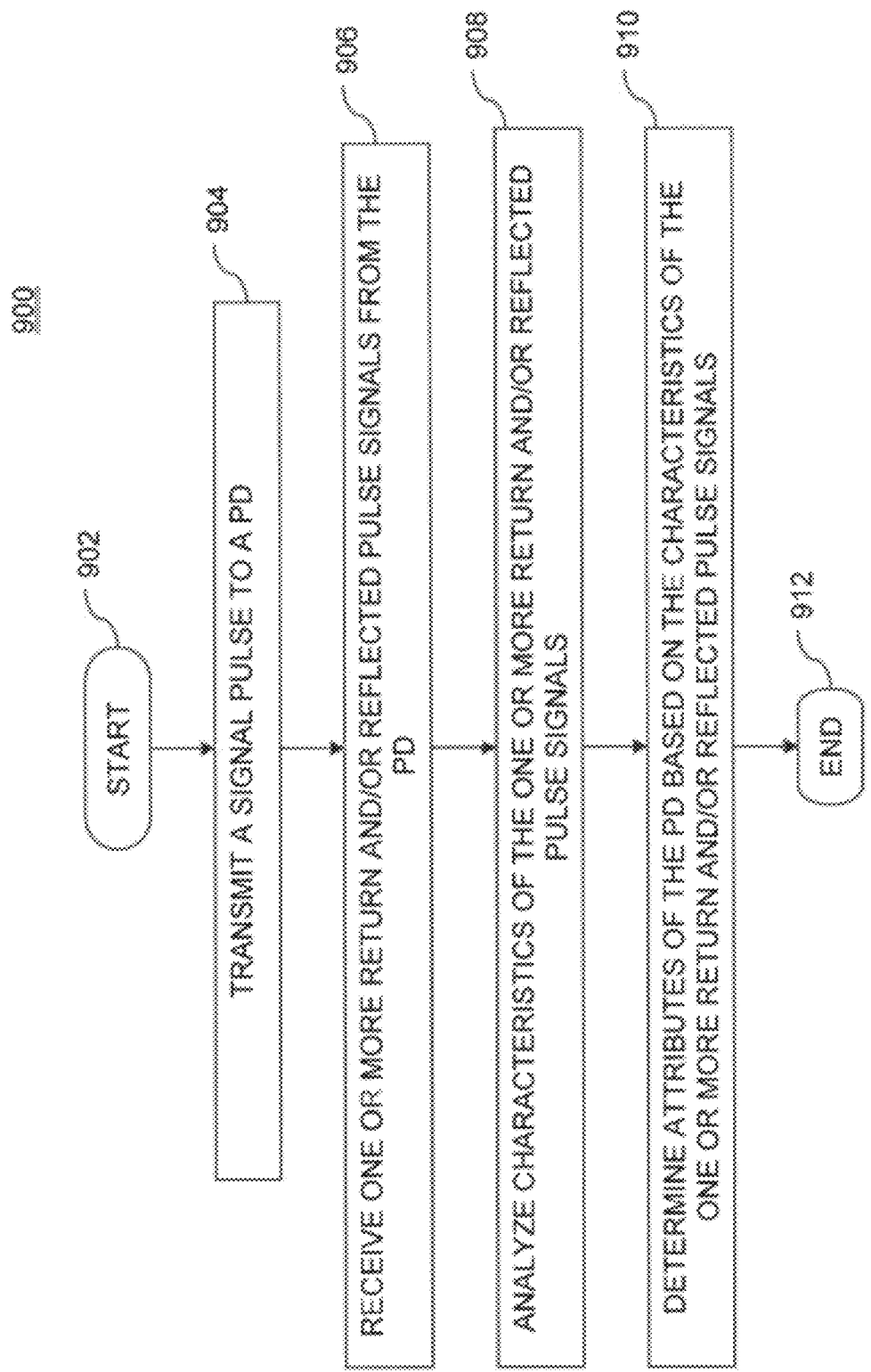
FIG. 9 is a flowchart illustrating a method of analyzing a powered device (PD), according to embodiments of the present invention.

FIG. 9 provides a flowchart 900 that illustrates a method of analyzing a powered device (PD), according to embodiments of the present invention. The invention is not limited to this operational description. Rather, it will be apparent to persons skilled in the relevant art(s) from the teachings herein that other operational steps may be within the scope and spirit of the present invention. In the following discussion, the steps in FIG. 9 are described.

Method 900 begins at step 902. At step 904, a signal pulse is transmitted to a PD. The signal pulse can include, but is not limited to, a time domain reflectometry (TDR) pulse, for example. At step 906, one or more return and/or reflected pulse signals are received from the PD. In step 908, characteristics of the one or more return and/or reflected pulse signals are analyzed. The characteristics can include, but are not limited to, frequency and/or voltage characteristics, such as polarity, intensity, and/or amplitude, for example. At step 910, attributes of the PD are determined based on the characteristics of the one or more return and/or reflected pulse signals. The attributes can include, but are not limited to, device validity, power classification, AC disconnect information, short circuit detection, current measurement, overload conditions, and/or inrush conditions, for example. Method 900 ends at step 912.

Figure 10:
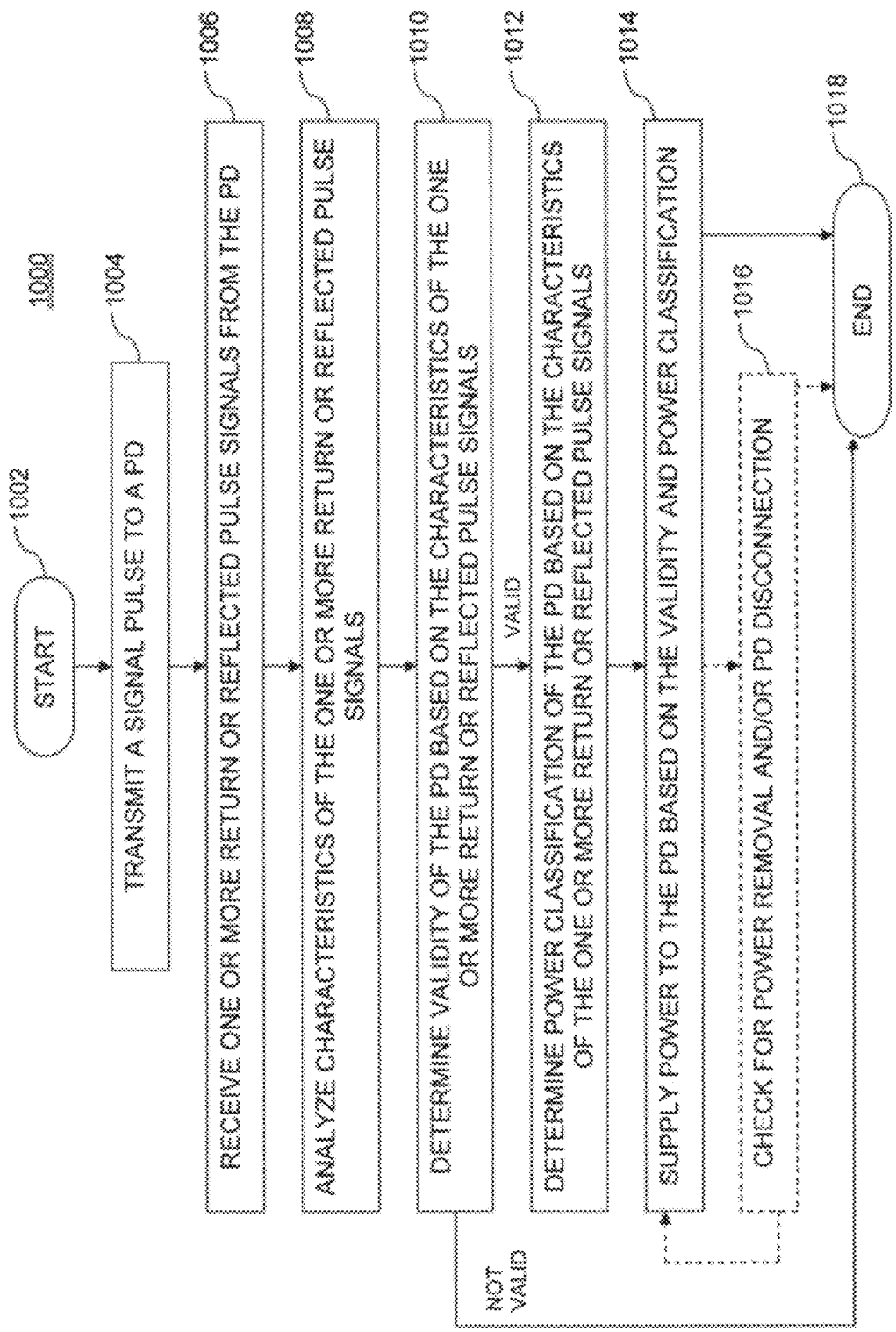
FIG. 10 is a flowchart illustrating a method of supplying power to a PD, according to embodiments of the present invention.

FIG. 10 provides a flowchart 1000 that illustrates a method of supplying power to a PD, according to embodiments of the present invention. The invention is not limited to this operational description. Rather, it will be apparent to persons skilled in the relevant art(s) from the teachings herein that other operational steps may be within the scope and spirit of the present invention. In the following discussion, the steps in FIG. 10 are described.

Method 1000 begins at step 1002. At step 1004, a signal pulse (such as a TDR pulse, for example) is transmitted to a PD. At step 1006, one or more return and/or reflected pulse signals are received from the PD. In step 1008, characteristics of the one or more return and/or reflected pulse signals are analyzed. Examples of return and/or reflected pulse signal characteristics can include, but are not limited to, frequency and/or voltage characteristics, such as polarity, intensity, and/or amplitude, for example. At step 1010, validity of the PD is determined based on the characteristics of the one or more return and/or reflected pulse signals. In this step, it is determined whether the PD is a valid device. If it is determined that the PD is not a valid device, method 1000 ends with no power being delivered to the PD. Otherwise, if it is determined that the PD is a valid device, the power classification is determined in step 1012. For example, the PD can be classified based on current measured through a classification resistor connected to the PD. This power classification can be according to a predetermined classification scheme, such as that defined in the IEEE 802.3af™ standard, for example (shown in FIGS. 5-7). In step 1014, power is supplied to the PD based on the power classification. Optionally, power removal and/or PD disconnection can be checked on a periodic basis in step 1016. Method 1000 ends at step 1018.

The above-described invention provides many advantages. It provides a smaller, more efficient PD analysis and power control system that saves host CPU processing time and power. Because there is no PSE controller chip with which the CPU must communicate, the CPU can spend its processing power doing other tasks. It can use hardware logic that already exists in the PHY chip for its analysis, with very little change to the algorithms involved. In addition, status indication is accomplished more easily. By eliminating the PSE controller chip, it becomes a much less expensive solution in the industry. It also eliminates the need for additional communication interfaces, and provides an innovative way to analyze present, future, and legacy powered devices. Looking forward, this may be implemented on the PD side as well, such that a communication means exists between two PHY chips that is separate from Ethernet protocol.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A Power-over-Ethernet (PoE) powered device (PD) analysis system, comprising:
   a first physical layer (PHY) chip, including a transceiver configured to provide a signal pulse to a PD having a second PHY chip; and
   a pulse transformer, coupled to the transceiver, and configured to relay the signal pulse provided by the transceiver to the PD via the second PHY chip,
   wherein the transceiver is configured to analyze characteristics of one or more return pulse signals returned to the first PHY chip from the second PHY chip to determine attributes of the PD.

2. The system of claim 1, wherein the one or more return pulse signals include a reflected pulse returned to the first PHY chip along a transmit line, coupling the first PHY chip to the second PHY chip, and a return pulse returned to the first PHY chip along a receive line, coupling the second PHY chip to the first PHY chip.

3. The system of claim 2, wherein the first PHY chip further comprises:
   a transmit transformer having one side coupled to the transceiver and another side coupled to the pulse transformer and the transmit line; and
   a receive transformer having one side coupled to the transceiver and another side coupled to the receive line.

4. The system of claim 2, wherein the second PHY chip comprises:
   a transceiver;
   a transmit transformer having one side coupled to the transceiver and another side coupled to the transmit line and the PD; and
   a receive transformer having one side coupled to the transceiver and another side coupled to the receive line and the PD.

5. The system of claim 1, wherein the signal pulse is a common mode pulse.

6. The system of claim 1, wherein the characteristics of the one or more return pulse signals include at least one of:
- voltage characteristics;
- frequency characteristics;
- polarity;
- intensity; and
- amplitude.

7. The system of claim 1, further comprising a voltage source that supplies power to the PD under direction of the first PHY chip based on the determined attributes of the PD.

8. The system of claim 7, further comprising opto-isolator circuitry that controls the supply of power to the PD under direction of the first PHY chip.

9. The system of claim 8, wherein the first PHY chip receives direction from an external source regarding the supply of power to the PD.

10. The system of claim 1, wherein the transceiver includes logic that analyzes the one or more return pulse signals.

11. The system of claim 1, wherein the first PHY chip includes an analog-to-digital converter to analyze the one or more return pulse signals.

12. The system of claim 1, further comprising:
- a capacitance coupled to a side of the pulse transformer opposite the first PHY chip that acts to block direct current in prevention of a short circuit.

13. A method of analyzing a powered device (PD), the method comprising:
- transmitting, via a pulse transformer coupled to a transceiver, a signal pulse to the PD;
- receiving, by the transceiver, one or more return pulse signals from the PD;
- analyzing, by logic on the transceiver, characteristics of the one or more return pulse signals; and
- determining, by the logic on the transceiver, attributes of the PD based on the characteristics of the one or more return pulse signals.

14. The method of claim 13, wherein the one or more return pulse signals include a reflected pulse and a return pulse.

15. The method of claim 13, wherein the signal pulse is a common mode signal pulse.

16. The method of claim 15, wherein the common mode signal pulse is based on a time domain reflectometry (TDR) pulse.

17. The method of claim 13, wherein the attributes of the PD include at least one of:
- device validity;
- power classification;
- AC disconnect information;
- short circuit detection;
- current measurement;
- overload conditions; and
- inrush conditions.

18. The method of claim 17, further comprising:
- supplying power to the PD based on the device validity and the power classification.

19. A method of supplying power to a powered device (PD), the method comprising:
- transmitting, via a pulse transformer coupled to a transceiver, a signal pulse to the PD;
- receiving, by the transceiver, one or more return pulse signals from the PD;
- analyzing by logic on the transceiver, characteristics of the one or more return pulse signals;
- determining, by the logic on the transceiver, validity and power classification of the PD based on the characteristics of the one or more return pulse signals; and
- supplying power to the PD based on the validity and power classification.

20. The method of claim 19, wherein the signal pulse is a common mode signal pulse.

* * * * *

UNITED STATES PATENT AND TRADEMARK OFFICE
CERTIFICATE OF CORRECTION

| | | |
|---|---|---|
| PATENT NO. | : 8,355,409 B2 | Page 1 of 1 |
| APPLICATION NO. | : 13/341600 | |
| DATED | : January 15, 2013 | |
| INVENTOR(S) | : Asif Hussain | |

It is certified that error appears in the above-identified patent and that said Letters Patent is hereby corrected as shown below:

Title Page, Item (57), Abstract, Line 4, "(PRY)" should be replaced with --(PHY)--.

Title Page, Item (57), Abstract, Line 6, "(PRY)" should be replaced with --(PHY)--.

Title Page, Item (57), Abstract, Line 7, "(PRY)" should be replaced with --(PHY)--.

Title Page, Item (57), Abstract, Line 8, "PRY chip. The first PRY chip" should be replaced with --PHY chip. The first PHY chip--.

In the Specifications

Column 10, Line 26, "analyzing" should be replaced with --analyzing,--.

Signed and Sealed this
Twenty-third Day of April, 2013

Teresa Stanek Rea
*Acting Director of the United States Patent and Trademark Office*